(12) United States Patent
Thompson et al.

(10) Patent No.: US 9,392,336 B1
(45) Date of Patent: Jul. 12, 2016

(54) CUSTOMIZED MOSAIC SCREEN

(71) Applicant: Cox Communications, Inc., Atlanta, GA (US)

(72) Inventors: Catherine Elizabeth Thompson, Roswell, GA (US); John Kelly King, Atlanta, GA (US); Katy Kozee, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 14/213,998

(22) Filed: Mar. 14, 2014

Related U.S. Application Data

(60) Provisional application No. 61/800,968, filed on Mar. 15, 2013, provisional application No. 61/801,555, filed on Mar. 15, 2013, provisional application No. 61/794,434, filed on Mar. 15, 2013.

(51) Int. Cl.
*H04N 21/482* (2011.01)
*H04N 21/485* (2011.01)

(52) U.S. Cl.
CPC ......... *H04N 21/4858* (2013.01); *H04N 21/482* (2013.01)

(58) Field of Classification Search
CPC .. H04N 5/4453; H04N 5/44591; H04N 7/163
USPC .............. 725/41, 97, 40, 47, 44, 37; 348/584, 348/705, 706
See application file for complete search history.

(56) References Cited

U.S. PATENT DOCUMENTS

| | | | |
|---|---|---|---|
| 7,117,440 B2 | 10/2006 | Gordon et al. | |
| 7,174,512 B2* | 2/2007 | Martin et al. | 715/719 |
| 7,185,355 B1 | 2/2007 | Ellis et al. | |
| 7,231,607 B2 | 6/2007 | Neely | |
| 7,757,252 B1* | 7/2010 | Agasse | 725/41 |
| 7,900,228 B2 | 3/2011 | Stark et al. | |
| 8,132,208 B2* | 3/2012 | Gonzalez | 725/46 |
| 8,789,126 B1* | 7/2014 | Nijim et al. | 725/133 |
| 8,856,847 B2* | 10/2014 | Soroushian | 725/97 |
| 8,930,999 B1* | 1/2015 | Maeng | 725/41 |

(Continued)

OTHER PUBLICATIONS

U.S. Appl. No. 14/214,090, filed Mar. 14, 2014 entitled "Personalized Mosaic Integrated With the Guide."

(Continued)

*Primary Examiner* — Nathan Flynn
*Assistant Examiner* — Caroline Somera
(74) *Attorney, Agent, or Firm* — Merchant & Gould P.C.

(57) ABSTRACT

A customized programming guide mosaic screen is provided. A user may selectively customize a mosaic display of video content items provided in a programming guide screen. One or more options may be provided for customizing the programming guide mosaic screen. The one or more options may include an option for populating the programming guide mosaic screen with recommended video content, an option for populating the programming guide mosaic screen with video content items with metadata that is similarly matched with a selected video content item or with a video content item currently being viewed by the user, or an option for populating the programming guide mosaic screen with one or more video content items associated with a specific mood. Upon selection of an option, currently airing content matching the selected option may populate one or more video panes in the mosaic display of the programming guide screen.

20 Claims, 8 Drawing Sheets

(56) References Cited

U.S. PATENT DOCUMENTS

| | | | |
|---|---|---|---|
| 8,997,151 B2* | 3/2015 | Chai et al. | 725/44 |
| 2003/0093792 A1 | 5/2003 | Labeeb et al. | |
| 2003/0115589 A1 | 6/2003 | D'Souza et al. | |
| 2006/0107302 A1 | 5/2006 | Zdepski | |
| 2006/0174269 A1 | 8/2006 | Hansen-Turton | |
| 2007/0011702 A1* | 1/2007 | Vaysman | 725/45 |
| 2007/0204302 A1 | 8/2007 | Calzone | |
| 2007/0234388 A1* | 10/2007 | King | 725/39 |
| 2007/0266403 A1* | 11/2007 | Ou et al. | 725/46 |
| 2008/0060006 A1 | 3/2008 | Shanks et al. | |
| 2008/0066103 A1 | 3/2008 | Ellis et al. | |
| 2008/0155600 A1* | 6/2008 | Klappert et al. | 725/44 |
| 2008/0235730 A1* | 9/2008 | Guillorit | 725/44 |
| 2009/0070809 A1 | 3/2009 | Kendall et al. | |
| 2009/0228943 A1* | 9/2009 | Ramaswamy | H04N 7/17318 725/109 |
| 2010/0131983 A1 | 5/2010 | Shannon et al. | |
| 2010/0262995 A1* | 10/2010 | Woods et al. | 725/40 |
| 2011/0173664 A1 | 7/2011 | Knudson | |
| 2011/0283325 A1* | 11/2011 | Tomita | 725/61 |
| 2011/0307925 A1 | 12/2011 | Vaysman et al. | |
| 2012/0011544 A1* | 1/2012 | Vaysman et al. | 725/38 |
| 2012/0131603 A1 | 5/2012 | Williamson et al. | |
| 2013/0067519 A1* | 3/2013 | Yates | 725/47 |
| 2014/0047467 A1* | 2/2014 | Arling et al. | 725/14 |
| 2014/0282734 A1* | 9/2014 | Stern | 725/48 |
| 2015/0237390 A1 | 8/2015 | Watters | |

OTHER PUBLICATIONS

U.S. Appl. No. 14/214,192, filed Mar. 14, 2014 entitled "Automatic Population of a Mosaic Screen."
U.S. Official Action dated Jan. 5, 2015 in U.S. Appl. No. 14/214,090, 31 pgs.
U.S. Official Action dated Jan. 12, 2015 in U.S. Appl. No. 14/214,192, 28 pgs.
U.S. Official Action dated Jan. 21, 2015 in U.S. Appl. No. 14/216,469, 32 pgs.
Notice of Allowance dated Dec. 15, 2015 in U.S. Appl. No. 14/214,090, 22 pgs.
U.S. Appl. No. 14/216,469, filed Mar. 17, 2014 entitled "Generating Andy Dynamically Updating a Personalized Programming Guide".
U.S. Official Action dated May 28, 2015 in U.S. Appl. No. 14/214,090, 23 pgs.
U.S. Official Action dated Jun. 5, 2015 in U.S. Appl. No. 14/214,192, 29 pgs.
U.S. Official Action dated Jul. 30, 2015 in U.S. Appl. No. 14/216,469, 37 pgs.
U.S. Official Action dated Jan. 4, 2016 in U.S. Appl. No. 14/214,192, 21 pgs.
U.S. Appl. No. 14/216469, Office Action mailed Mar. 17, 2016, 22 pgs.

* cited by examiner

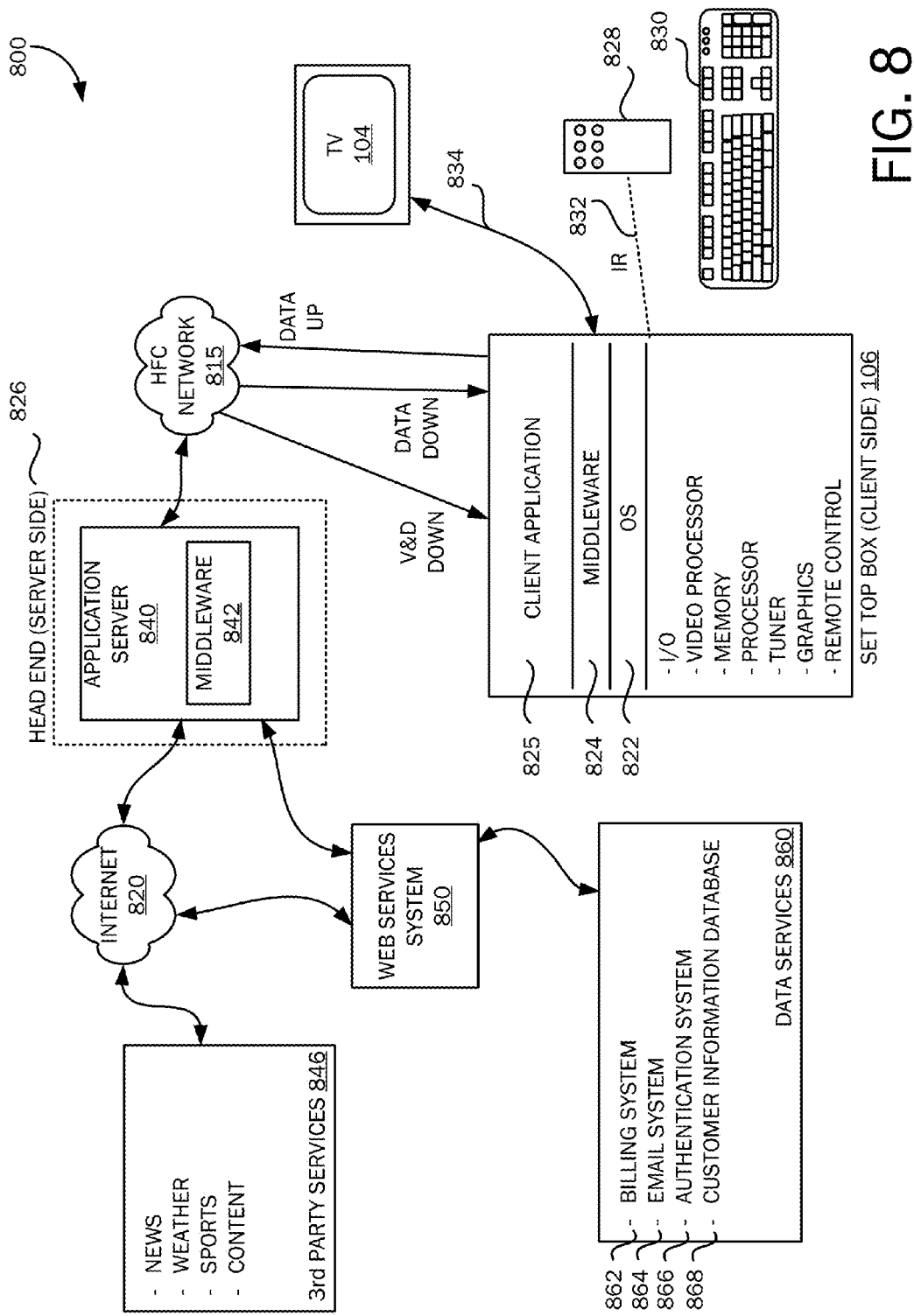

CUSTOMIZED MOSAIC SCREEN

CROSS-REFERENCE TO RELATED APPLICATIONS

The application claims priority to U.S. Provisional Patent Application No. 61/800,968 titled "Customized Mosaic Screen" filed Mar. 15, 2013 and U.S. Provisional Patent Application No. 61/801,555 titled "Personalized Mosaics Integrated with the Guide" filed Mar. 15, 2013, and U.S. Provisional Patent Application No. 61/794,434 titled "Auto-Population of a Mosaic Screen" filed Mar. 15, 2013, the disclosures of which are hereby incorporated by reference in their entireties.

BACKGROUND

Many television services providers offer a mosaic screen where a display of a collection of elements or channels displayed on a single screen is provided. Most often, each channel may be represented as a thumbnail image or video feed of the channel which a user may be enabled to select for viewing. Mosaic channels that are offered today may be preselected channels. The channels may either be static, or may be manually selected to be included by a user.

It is with respect to these and other considerations that the present invention has been made.

SUMMARY

A customized programming guide mosaic screen is provided. The illustrated embodiments allow users to customize a view of video content provided in a programming guide mosaic screen. Specifically, a user may be provided with one or more options for customizing the programming guide mosaic screen. The one or more options may include an option for populating the programming guide mosaic screen with recommended video content, an option for populating the programming guide mosaic screen with video content items having metadata similarly matched with a selected video content item or with a video content item currently being viewed by the user, or an option for populating the programming guide mosaic screen with one or more video content items associated with a specific mood. Upon selection of an option, currently airing content matching the selected option may populate one or more video panes in the mosaic display of the programming guide screen. Further, if the user selects a new option, the programming guide may be refreshed and video content associated with the selected option may be displayed in the mosaic screen.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout the several figures:

FIG. 8 is a simplified block diagram illustrating a cable television services system architecture providing an operating environment according to an embodiment.

DETAILED DESCRIPTION

Figure 1:
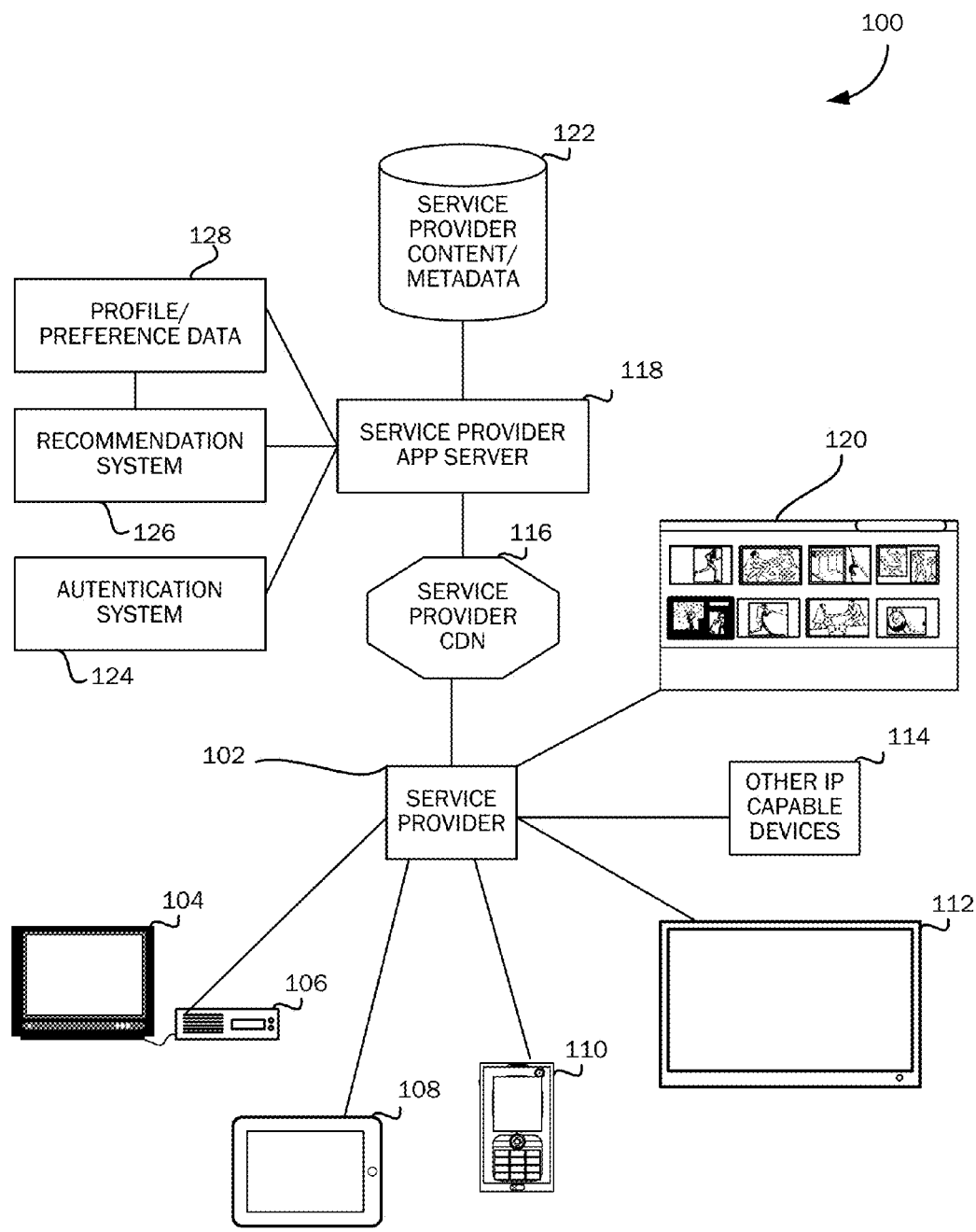
FIG. 1 is a simplified block diagram of an exemplary system for providing customization of a programming guide mosaic screen.

As briefly described above, embodiments of the present invention are directed to providing a customized programming guide mosaic screen. The illustrated embodiments may allow a user to customize his/her view of video content items on a mosaic screen. Specifically, a user may be provided with one or more options that are associated with one or more video content items. Once the user selectively indicates to view content associated with an option, the content that is associated with the option may be displayed on the mosaic screen. Further, if the user selects a new option, the mosaic screen may be refreshed and a display of the new content associated with the new option may be provided.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram of an exemplary system 100 for providing customization of a programming guide mosaic screen. Referring to the lower portion of FIG. 1, a service provider 102 is illustrated for providing a variety of video content items to users/subscribers via one or more receiver devices. The service provider 102 is illustrative of any service provider, for example, a cable television service provider, a satellite-based television service provider, an Internet protocol-based service provider, or any other service provider that is operable to provide audio, video, or a combination of audio and video content to users/subscribers for consumption via a variety of receiving devices. A detailed illustration and description of an example cable television services provider system is provided below with reference to FIG. 8.

Receiving devices include any device capable of receiving audio and video content and for allowing consumption of the content. For example, a receiving device may include such devices as a television 104 and associated set-top box 106, a tablet computing device 108, a mobile telephone 110, a smart television 112, or other (IP) capable device 114. As will be described below, each of these types of devices may be used for accessing and consuming content via a primary service provider.

A service provider content delivery network (CDN) 116 is illustrated in association with the service provider 102, and a service provider back end and application server 118 are illustrated in association with a service provider CDN. As should be appreciated, the layout of the functionalities of the service provider including the service provider CDN and the service provider back end and application server system are for purposes of illustration only and are not restrictive of the various layouts and combinations of systems that may be utilized by a given service provider for providing content to users/subscribers.

According to embodiments, a service provider back end/application server 118 may provide functionality for maintaining profile information on users/subscribers including permissions for users/subscribers to utilize service provider functionality including consumption of service provider content and including such functionalities as content preferences, parental control systems, billing systems, and the like. The back end and application server for the service provider may provide operating functionality, for example, one or more software applications and associated databases for directing content distribution provided by the service provider 102 to users/subscribers at the receiving devices 104, 108, 110, 112, 114.

The service provider content delivery network (CDN) 116 is illustrative of a delivery or distribution network which may include a distributed system of servers, databases, and other content repositories for distributing audio and video content, text, graphics, media files, software applications and associated documents, on-demand content, social media content, live streaming media content, and the like from the service provider 102 to the users/subscribers. CDNs typically function by receiving requests from clients, checking a local cache for a copy of the requested resource, or querying some source if a requested resource is not in the cache or has expired for example. CDN servers can be strategically located at the edges of various networks to limit loads on network interconnects and backbones. CDN servers can be redundantly deployed and interact with other CDN servers to respond to content requests from clients in attempts to optimize content delivery. For example, network edge servers can enable ease of browsing, navigating and streaming of content, including streaming live video. For example, if a given user/subscriber operating the tablet computing device 108 selects a news story for live streaming to the tablet computing device 108 as offered by the service provider 102, the application server at the back end application server may cause a media player to activate for streaming the desired content from the service provider CDN 116 to the user's tablet computing device 108 via IP-based transmission to the tablet computing device 108.

A programming guide mosaic screen 120 is illustrated with which the service provider 102 may provide information about and access to one or more features or attributes of available programming. The programming guide mosaic screen 120 may be displayed on any of the content receiving devices 104, 108, 110, 112, 114 for allowing users/subscribers to review information about and gain access to available programming provided by the service provider 102. As will be described herein, in addition to programming provided by the service provider 102, the programming guide mosaic screen 120 may be populated with information identifying and describing third party content, and the user/subscriber may utilize the programming guide mosaic screen 120 for navigating to and consuming the third party content.

The service provider content/metadata 122 is illustrative of content and associated descriptive metadata that may be maintained and provided by the primary service provider 102, or may be obtained from third party sources. The content/metadata 122 may also comprise information associated with the content including descriptive metadata for use in distributing the content and associated metadata through the back end application server of the service provider 102 via the service provider CDN 116, as described above. As should be appreciated, metadata associated with content may include information such as content titles, content authors, content creation date, content ratings, information describing content plots, summaries, mood, or any other information that may be provided in association with a given content item. In addition to metadata associated with a given content item, for example, a movie, television show, news event, sports event, and the like, additional metadata for the content item may be produced and provided by the service provider, for example, information relating to viewing times, viewing channels, and the like designated by the service provider 102.

The authentication system 124 is illustrative of one or more software applications and databases operative to determine whether a requesting user/subscriber may access requested primary service provider content according to embodiments. That is, if a user/subscriber attempts to access one or more primary service provider content items, the authentication system 124 may be queried by the service provider back end application server 118 for determining whether the requesting user/subscriber is authorized to access the requested information including a determination of whether parental controls or other mechanisms are in place for blocking access to a requesting user/subscriber.

The recommendation system 126 is illustrative of one or more software applications operative to query profile/preference data 128 maintained by the primary service provider via the back end application server for users/subscribers for recommending both primary service provider content and third party content. For example, if profile/preference data maintained for a given user/subscriber in the profile/preference data 128 shows that a given user is fond of a particular genre of content, for example, action movies, the recommendation system 126 may utilize such profile/preference data for recommending both primary service provider content and third party content to the user/subscriber via the programming guide mosaic screen 120.

Figure 2:
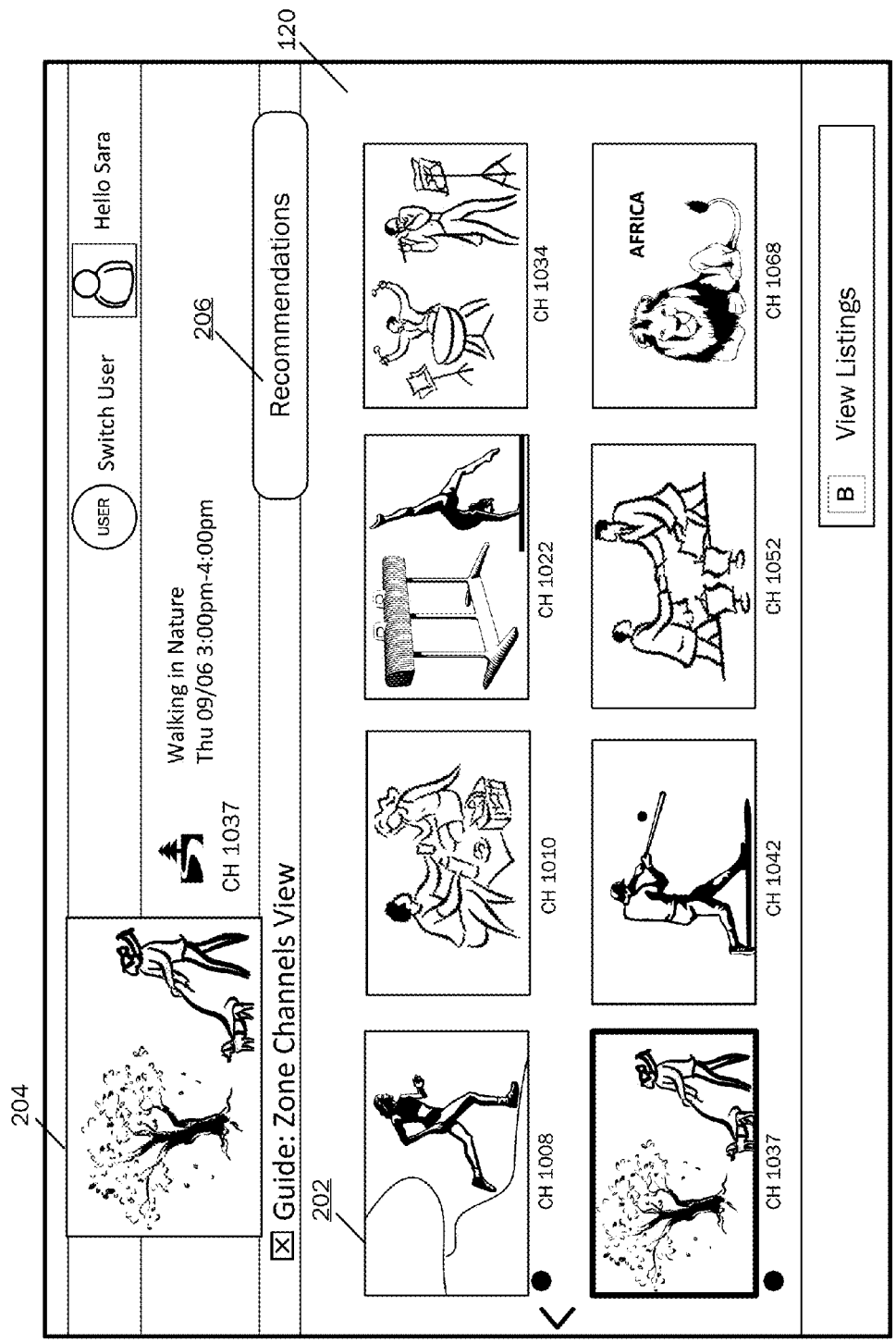
FIG. 2 is an illustration of an example programming guide mosaic screen comprising a plurality of recommended video content items.

A programming guide mosaic screen 120 may comprise a plurality of individual video tiles/panes having currently airing content displayed on each of the video panes on a single mosaic screen. Embodiments provide for enabling a user to customize the type of content displayed in a mosaic screen 120. According to an embodiment and as illustrated in FIG. 2, a user may choose to populate a programming guide mosaic screen 120 with a plurality of video content items recommended to the user via the recommendation system 126. That is, the user may select a "recommendations" 206 mosaic display of the programming guide. For example, a selectable menu option may be provided or a button on a remote control may be provided for selecting a "recommendations" 206 mosaic display of the programming guide. The recommended video content items may be displayed in the plurality of video panes 202, and may include currently airing programs from which the user may choose to view at that time. According to embodiments, recommended video content items may be based on the user's viewing history, preferences, and feedback. Recommended video content may also be based on content the user is currently viewing. A user may select to remove a recommended content item displayed in a video pane 202 from the "recommendations" 206 mosaic display of the programming guide. Accordingly, the mosaic screen 120 may be dynamically refreshed, and another recommended video content item may be displayed in place of the selectively removed video content item. According to an embodiment, a next most highly recommended content item may replace the selectively removed video content item.

As illustrated in FIG. 2, the programming guide mosaic screen 120 may also comprise a scaled window 204. A display of content the user is currently watching (i.e., content playing on a channel currently connected to) may be displayed in the scaled window 204. For example, if a user is watching CNN and selects to view the programming guide to see what else is on, the content playing on CNN may continue to be displayed in the scaled window 204. Additionally, a user may select a video pane 202 displayed in the programming guide mosaic screen 120, and the content playing in the selected video pane 202 may be displayed in the scaled window 204.

Figure 3:
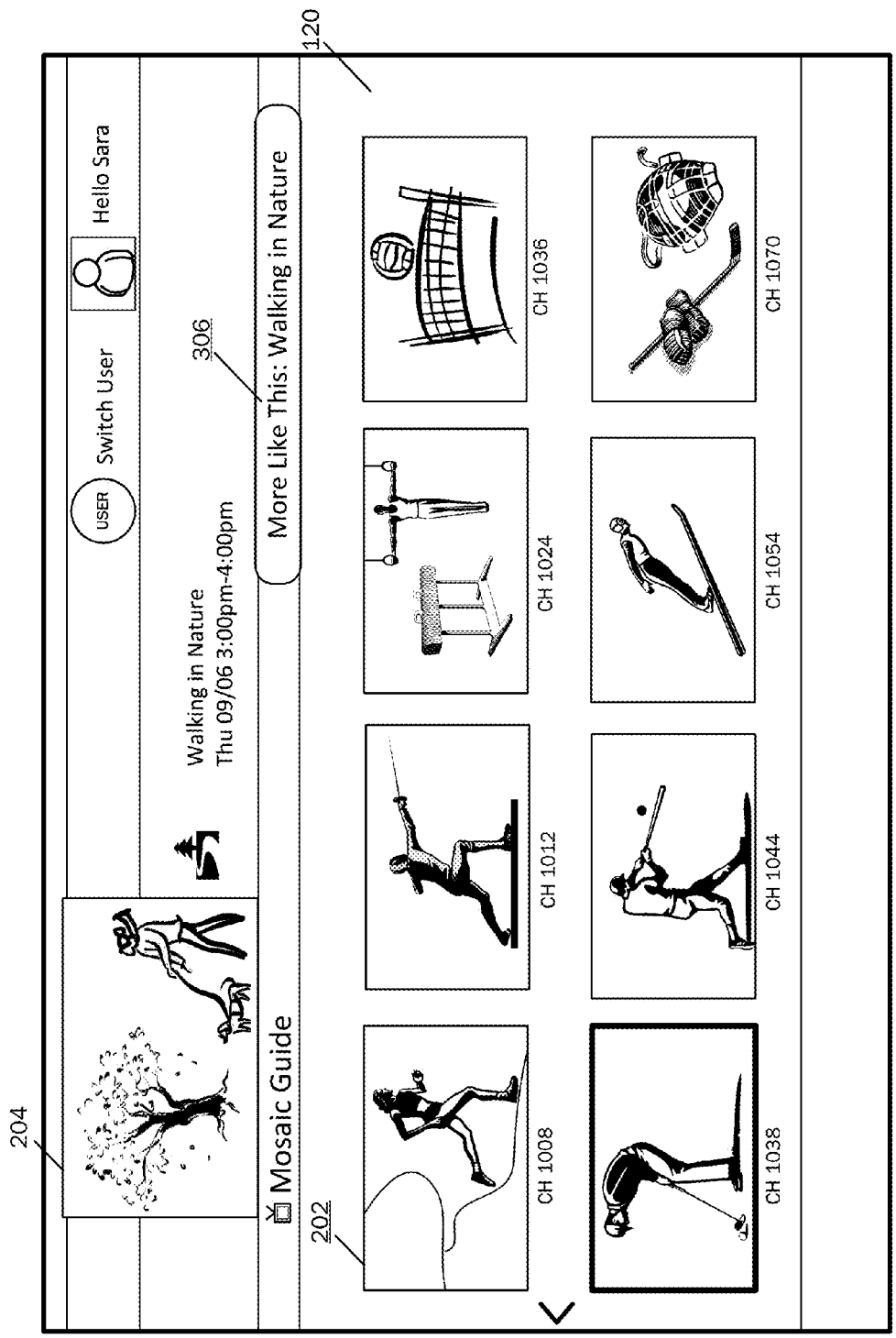
FIG. 3 is an illustration of an example "more like this" programming guide mosaic screen.

According to another embodiment, a user may choose to populate a programming guide mosaic screen 120 with content similar to content the user has selected in the guide or is currently watching. For example, the user may select a "more like this" 306 mosaic display of the programming guide. Referring now to FIG. 3, an example programming guide mosaic screen 120 comprising a display of content with metadata similarly matching metadata of a selected video content item or a video content item the user is currently watching is illustrated. Selection of a "more like this" option may provide content items from various sources based upon tags in the metadata which may include tags associated with a genre, a male/female lead role, a specific male/female actor, year of release, viewership age (e.g., under 12, teen, adult), and the like.

A "more like this" option may be provided to the user in a variety of formats. For example, a button on a remote control may be provided for selecting a "more like this" 306 mosaic display of the programming guide, an option may be provided and selected when viewing a video content item, or the user may select a video pane 202 in the programming guide and then select a "more like this" option to populate the programming guide with currently airing content items similar to the content in the selected video pane 202.

According to an embodiment, a "more like this" option may be selected from a "recommendations" 206 mosaic display of the programming guide. Selection of a "more like this" option from a "recommendations" 206 mosaic display of the programming guide may provide for populating the programming guide mosaic screen 120 with content that is tagged in the metadata such that it is associated with a selected content item and has other criteria that would make it a recommendation for the user.

Figure 4:
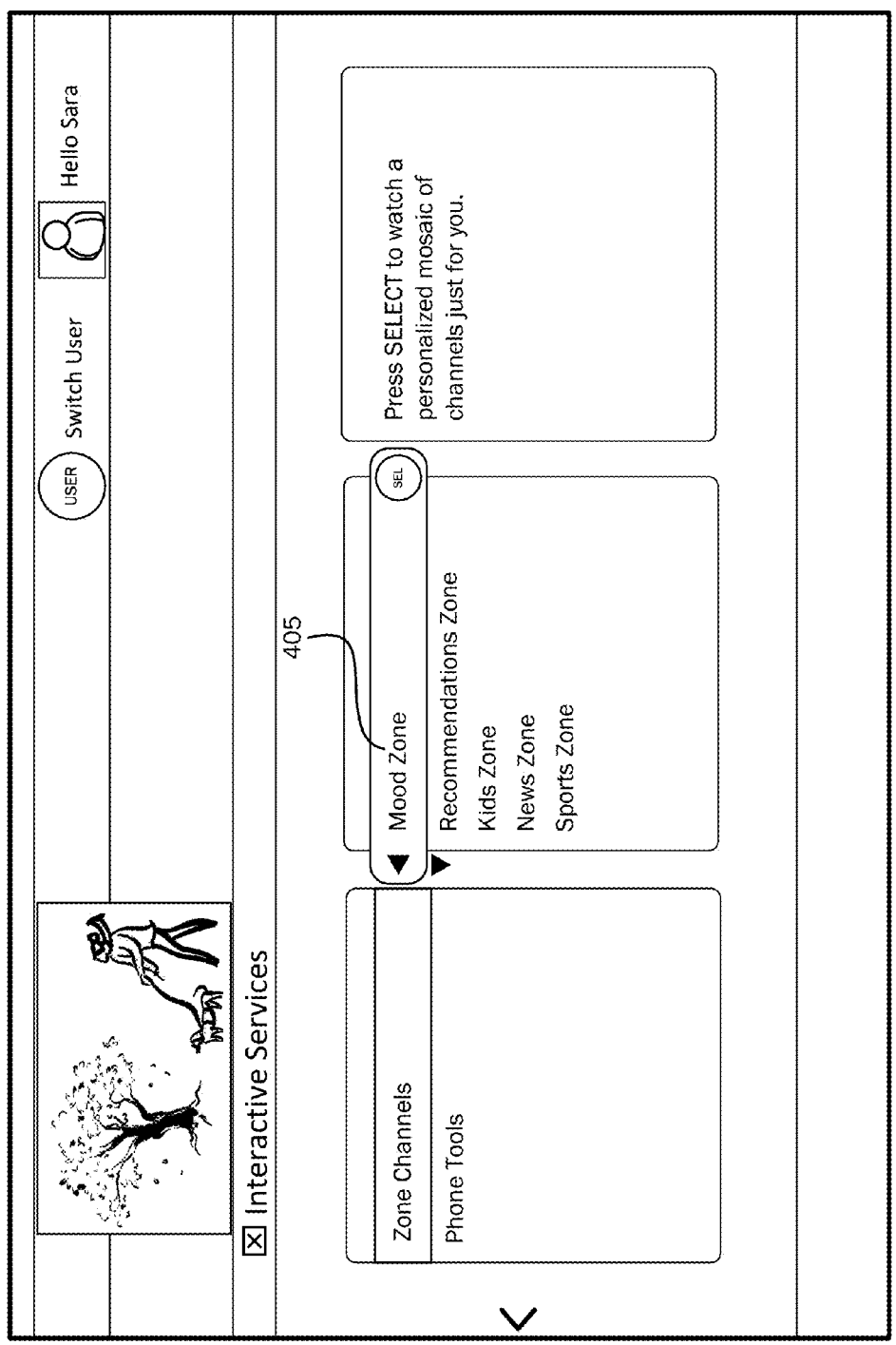
FIG. 4 is an illustration of an example guide user interface from which a user may select a "mood" mosaic display of the programming guide.

According to another embodiment, a user may choose to populate a programming guide mosaic screen 120 with content relating to a particular mood. That is, the user may select a "mood" 606 mosaic display of the programming guide. Referring now to FIG. 4, an example guide user interface is illustrated from which a user may select a "mood" mosaic display of the programming guide. For example and as illustrated, a "mood" option 405 may be provided in a programming guide menu. As another example, a "mood" option may be provided as a button on a remote control.

Figure 5:
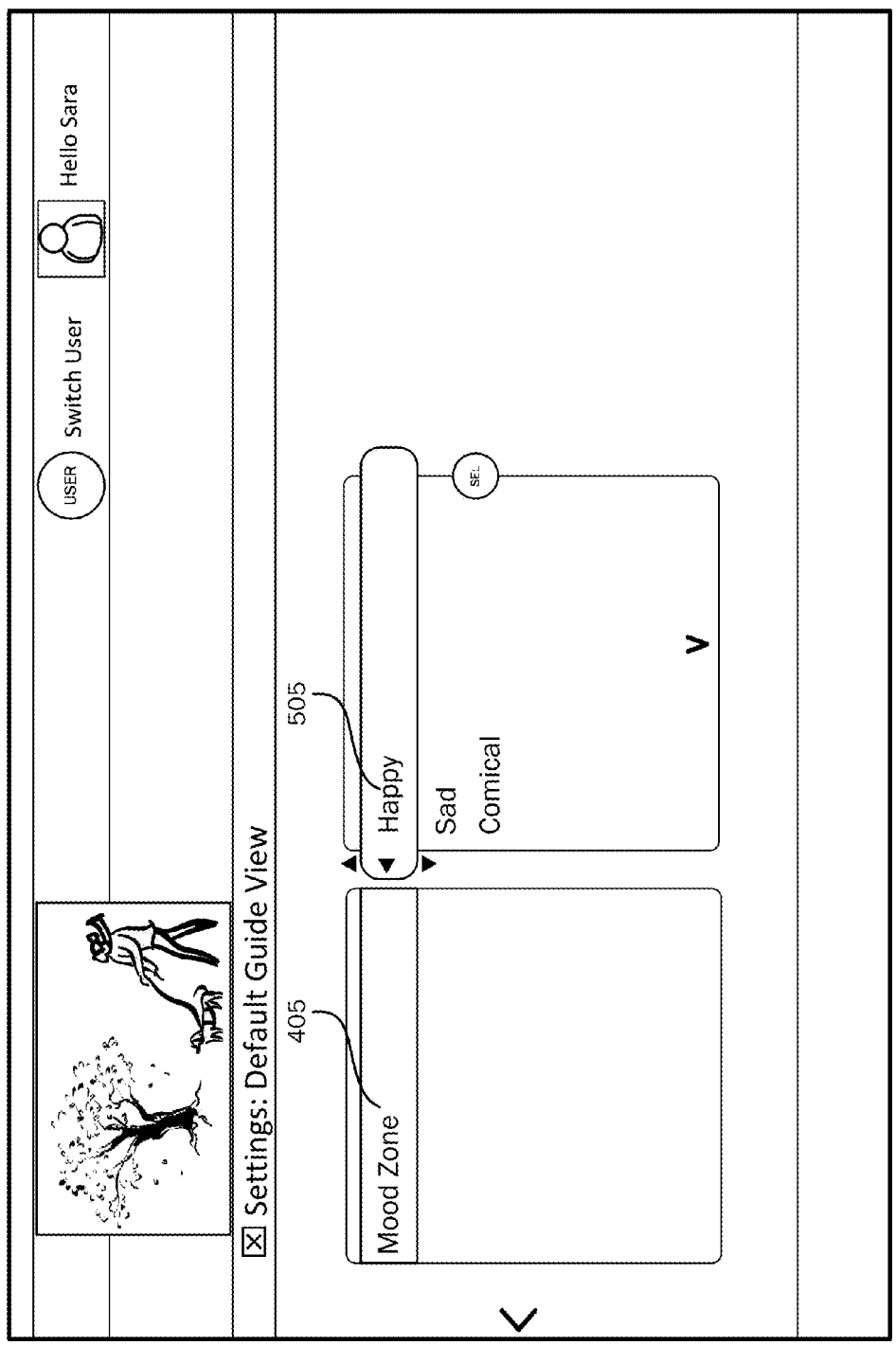
FIG. 5 is an illustration of an example guide user interface from which a user may select a specific "mood type;"

According to an embodiment, upon selection of a "mood" option 405, a plurality of specific "mood types" 505 from which the user may choose may be displayed as illustrated in FIG. 5. For example, various "mood types" 505 may include, but are not limited to, a "happy" mood, "sad" mood, or a "comical" mood. The "mood types" 505 may be selectable such that when a particular "mood type" 505 is selected, available content may be filtered, and video panes 202 in the programming guide mosaic screen 120 may be populated with video content items relating to the selected "mood type" 505.

According to another embodiment, a particular "mood type" 505 may be automatically selected based on the user's viewing history, preferences, and feedback. For example, if a user generally watches comedy shows, a determination may be made that the user has an affinity for video content that may be classified as "comical" mood content according to its metadata.

Figure 6:
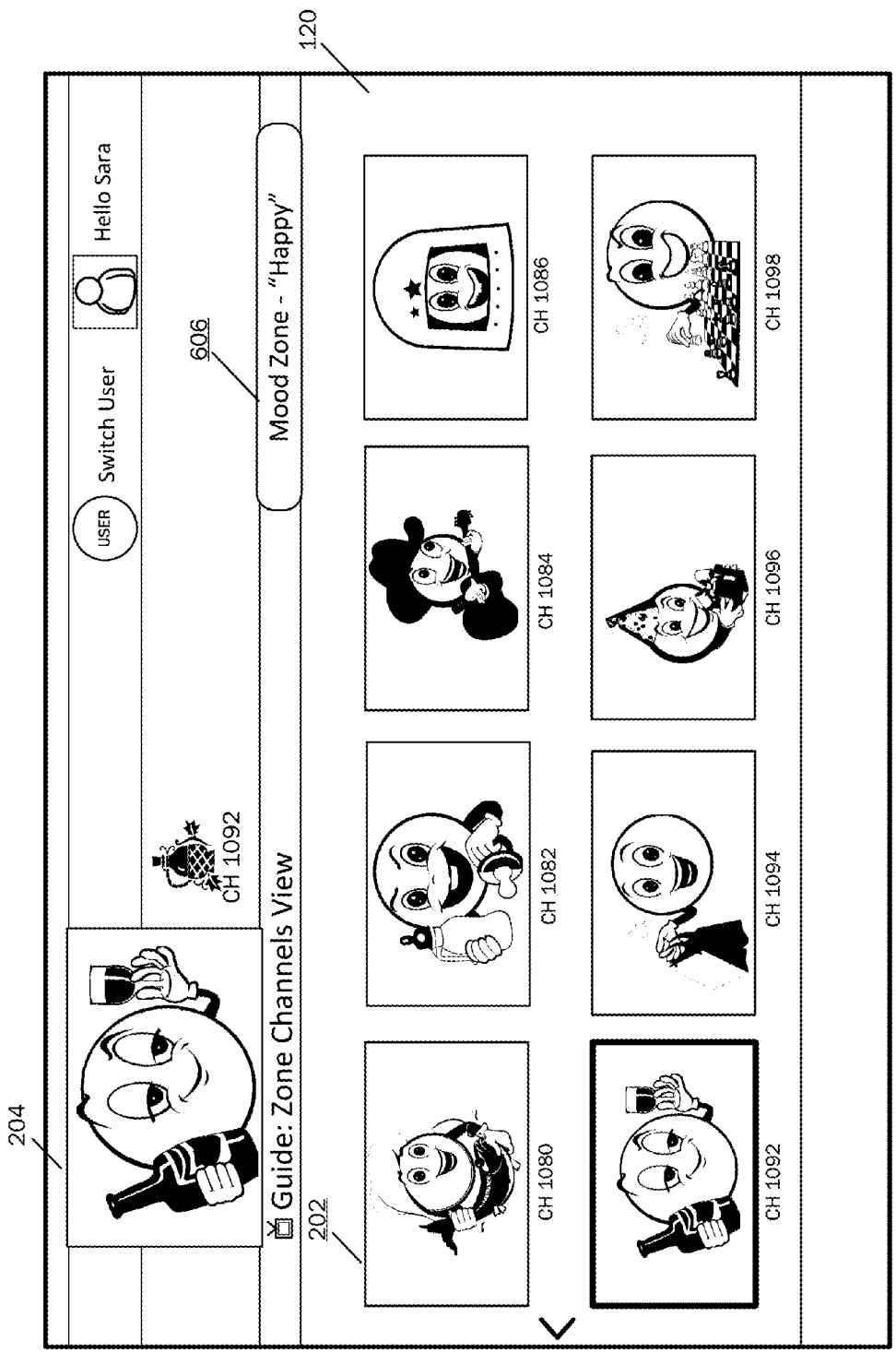
FIG. 6 is an illustration of an example "mood" programming guide mosaic screen.

With reference now to FIG. 6, an example "mood" 606 mosaic display of the programming guide is illustrated. According to embodiments, a plurality of video panes 202 may be displayed in the "mood" 606 programming guide mosaic screen 120, wherein a video content item having metadata matching the selected or automatically determined "mood type" 505 may be displayed in each video pane 202. The video content items selected to be displayed in the "mood" 606 mosaic screen 120 may be tagged with metadata matching the particular mood. Further, the "mood" mosaic screen may be automatically populated with linear content that is identified as fitting the selected or automatically determined "mood" at that particular time. If another "mood type" 505 is selected, the content displayed in the video panes 202 may be refreshed and new video content fitting the specified mood criteria may be displayed in the mosaic screen.

According to an embodiment, a "mood" option 405 may be selected from a "recommendations" 206 mosaic display of the programming guide. Selection of a "mood" option 405 from a "recommendations" 206 mosaic display of the programming guide may provide for filtering the recommended content in the programming guide mosaic screen 120 to content that is tagged in the metadata such that it is associated with a selected "mood type" 505 and has other criteria that would make it a recommendation for the user.

Figure 7:
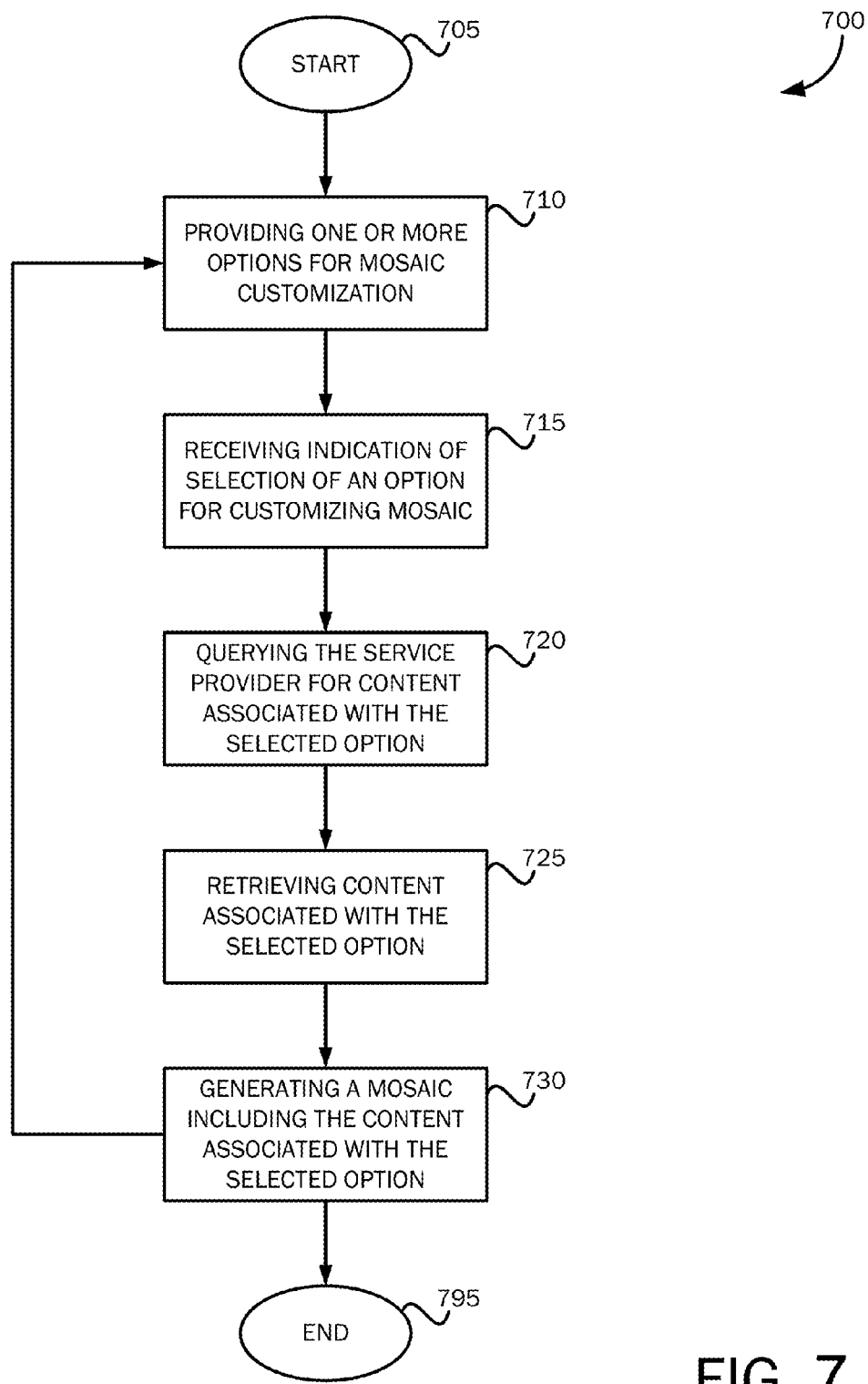
FIG. 7 is a flowchart illustrating a method for generating a customized mosaic programming guide.

FIG. 7 is a flowchart of a method 700 for providing a customized programming guide mosaic screen 120 according to an embodiment. The method 700 starts at OPERATION 705, and proceeds to OPERATION 710 where one or more options for customizing a programming guide mosaic screen 120 are provided. The one or more options may utilize any attribute that is associated with video content items in order to customize the content being displayed in the mosaic. For example, in one embodiment, the options may include a "recommendations" option, a "more like this" option, and a "mood" option.

At OPERATION 715, an indication of a selection of an option for customizing the programming guide mosaic screen 120 may be received. As described above, the selection may be made in various ways, for example, via a selection of a displayed programming guide menu option or via a selection of a "recommendations" option button, a "more like this" option button, or a "mood" option button on a remote control.

At OPERATION 720, the service provider may be queried for content associated with the selected option. Various attributes may be utilized to query for content. In one embodiment, if a selection of a "recommendations" option is received, attributes from a user's profile may be utilized to query for content common to content that is frequently viewed by the user. In another embodiment, if a selection of a "more like this" option is received, attributes from a selected content item or a content item currently being viewed by the user may be utilized to locate other content items that have similar attributes. Further, if a selection of a "mood" option is received, a query for content items tagged with metadata associated with a selected "mood type" (e.g., "happy," "sad," "comical," etc.) may be performed.

The method may proceed to OPERATION 725, where video content associated with the selected option may be retrieved. The retrieved content may be located by the queries discussed above.

At OPERATION 730, a programming guide mosaic screen 120 may be generated including the content retrieved at OPERATION 725 and as illustrated and described with respect to FIGS. 2, 3, and 6.

The method 700 may return to OPERATION 710 where one or more mosaic screen customization options may be provided, or may end at OPERATION 795.

FIG. 8 is a simplified block diagram illustrating a cable television services system 800 (hereafter referred to as "CATV") architecture providing an operating environment according to an embodiment. As can be appreciated, a CATV architecture is but one of various types of systems that may be utilized to provide recording of network-related content. For example, other systems such as satellite-based television services systems may be utilized for providing interaction between a customer/subscriber and third party content as set out above. Referring now to FIG. 8, digital and analog video programming, information content and interactive television services are provided via a hybrid fiber coax (HFC) network 815 to a television set 104 for consumption by a cable television/services system customer. As is known to those skilled in the art, HFC networks 815 combine both optical fiber and coaxial cable lines. Typically, optical fiber runs from the cable head end 826 to neighborhoods of subscribers. Coaxial cable runs from the optical fiber feeders to each customer or subscriber. The functionality of the HFC network 815 allows for efficient bidirectional data flow between the client-side set-top box 106 and a server-side application server 840 (also referred to as back end application server).

The CATV system 800 is in the form of a distributed client-server computing system for providing video and data flow across the HFC network 815 between server-side services providers (e.g., cable television/services providers) via a server-side head end 826 and a client-side customer via a client-side set-top box (STB) 106 functionally connected to a customer receiving device, such as the television set 104. As is understood by those skilled in the art, modern CATV systems 800 may provide a variety of services across the HFC network 815 including traditional digital and analog video programming, telephone services, high speed Internet access, video-on-demand, and information services.

On the client side of the CATV system 800, digital and analog video programming and digital and analog data are provided to the customer television set 104 via the set-top box (STB) 106. Interactive television services that allow a customer to input data to the CATV system 800 likewise are provided by the STB 106. As illustrated in FIG. 8, the STB 106 is a multipurpose computing device having a computer processor, memory, and an input/output mechanism. The input/output mechanism receives input from server-side processes via the HFC network 815 and from customers via input devices such as the remote control device 828, keyboard 830, or other computing device, such as a tablet/slate computer, smart phone, etc. The remote control device 828 and the keyboard 830 may communicate with the STB 106 via a suitable communication transport such as the infrared connection 832. The STB 106 also includes a video processor for processing and providing digital and analog video signaling to the television set 104 via a cable communication transport 834. A multi-channel tuner is provided for processing video and data to and from the STB 106 and the server-side head end system 826, described below.

The STB 106 also includes an operating system 822 for directing the functions of the STB 106 in conjunction with a variety of client applications 825. For example, if a client application 825 requires a news flash from a third-party news source to be displayed on the television 104, the operating system 822 may cause the graphics functionality and video processor of the STB 106, for example, to output the news flash to the television 104 at the direction of the client application 825 responsible for displaying news items. According to embodiments, the client applications 825 may include one or more applications suitable for coordinating third party content items to the television 104.

Because a variety of different operating systems 822 may be utilized by a variety of different brands and types of set-top boxes, a middleware layer 824 may be provided to allow a given software application to be executed by a variety of different operating systems. According to an embodiment, the middleware layer 824 may include a set of application programming interfaces (APIs) that are exposed to client applications 825 and operating systems 822 that allow the client applications to communicate with the operating systems through common data calls understood via the API set. As described below, a corresponding middleware layer is included on the server side of the CATV system 800 for facilitating communication between the server-side application server and the client-side STB 106. The middleware layer 842 of the server-side application server and the middleware layer 824 of the client-side STB 106 may format data passed between the client side and server side according to the Extensible Markup Language (XML).

According to one embodiment, the set-top box 106 passes digital and analog video and data signaling to the television 104 via a one-way communication transport 834. According to other embodiments, two-way communication transports may be utilized, for example, via high definition multimedia (HDMI) ports. The STB 106 may receive video and data from the server side of the CATV system 800 via the HFC network 815 through a video/data downlink and data via a data downlink. The STB 106 may transmit data from the client side of the CATV system 800 to the server side of the CATV system 800 via the HFC network 815 via one data uplink. The video/data downlink is an "in band" downlink that allows for digital and analog video and data signaling from the server side of the CATV system 800 through the HFC network 815 to the set-top box 106 for use by the STB 106 and for distribution to the television set 104. As is understood by those skilled in the art, the "in band" signaling space operates at a relative high frequency, e.g., between 54 and 1000 megahertz. The signaling space is generally divided into 6 megahertz channels in which may be transmitted as a single analog signal or a greater number (e.g., ten) of digital signals.

The data downlink and the data uplink, illustrated in FIG. 8, between the HFC network 815 and the set-top box 106 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 106 and the server-side application server 840 is typically passed through the "out of band" data links. Alternatively, an "in band" data carousel may be positioned in an "in band" channel into which a data feed may be processed from the server-side application server 840 through the HFC network 815 to the client-side STB 106. Operation of data transport between components of the CATV system 800, described with reference to FIG. 8, is well known to those skilled in the art.

Referring still to FIG. 8, the head end (also referred to as the back end) of the CATV system 800 is positioned on the server side of the CATV system and includes hardware and software systems responsible for originating and managing content for distributing through the HFC network 815 to client-side STBs 106 for presentation to customers via televisions 104. As described above, a number of services may be provided by the CATV system 800, including digital and analog video programming, interactive television services, telephone services, video-on-demand services, targeted advertising, and provision of information content.

The application server 840 is a general-purpose computing system operative to assemble and manage data sent to and received from the client-side set-top box 106 via the HFC network 815. As described above with reference to the set-top box 106, the application server 840 includes a middleware layer 842 for processing and preparing data from the head end of the CATV system 800 for receipt and use by the client-side set-top box 106. For example, the application server 840 via the middleware layer 842 may obtain data from third-party services 846 via the Internet 820 for transmitting to a customer through the HFC network 815 and the set-top box 106. For example, content metadata a third-party content provider service may be downloaded by the application server via the Internet 820. When the application server 840 receives the downloaded content metadata, the middleware layer 842 may be utilized to format the content metadata for receipt and use by the set-top box 106. Therefore, content metadata may be sent and categorized based on the availability to the customer's program guide data.

According to one embodiment, data obtained and managed by the middleware layer 842 of the application server 840 is formatted according to the Extensible Markup Language and is passed to the set-top box 106 through the HFC network 815 where the XML-formatted data may be utilized by a client application 825 in concert with the middleware layer 824, as described above. As should be appreciated by those skilled in the art, a variety of third-party services data, including news data, weather data, sports data and other information content may be obtained by the application server 840 via distributed computing environments such as the Internet 820 for provision to customers via the HFC network 815 and the set-top box 106.

According to embodiments, the application server 840 obtains customer support services data, including billing data, information on customer work order status, answers to frequently asked questions, services provider contact information, and the like from data services 860 for provision to the customer via an interactive television session. As illustrated in FIG. 8, the services provider data services 860 include a number of services operated by the services provider of the CATV system 800 which may include data on a given customer.

A billing system 862 may include information such as a customer's name, street address, business identification number, Social Security number, credit history, and information regarding services and products subscribed to by the customer. According to embodiments, the billing system 862 may also include billing data for services and products subscribed to by the customer for bill processing, billing presentment and payment receipt.

A customer information database 868 may include general information about customers such as place of employment, business address, business telephone number, and demographic information such as age, gender, educational level, and the like. The customer information database 868 may also include information on pending work orders for services or products ordered by the customer. The customer information database 868 may also include general customer information such as answers to frequently asked customer questions and contact information for various service provider offices/departments. According to an embodiment, the customer information database 868 may also include profile information for customers/subscribers that include permissions and authentication information associated with or required for accessing and recording third party content as set out above. As should be understood, this information may be stored in a variety of disparate databases operated by the cable services provider.

Referring still to FIG. 8, web services system 850 is illustrated between the application server 840 and the data services 860. According to embodiments, web services system 850 serves as a collection point for data requested from each of the disparate data services systems comprising the data services 860. According to embodiments, when the application server 840 requires customer services data from one or more of the data services 860, the application server 840 passes a data query to the web services system 850. The web services system formulates a data query to each of the available data services systems for obtaining any required data for a requesting customer as identified by a set-top box identification associated with the customer. The web services system 850 serves as an abstraction layer between the various data services systems and the application server 840. That is, the application server 840 is not required to communicate with the disparate data services systems, nor is the application server 840 required to understand the data structures or data types utilized by the disparate data services systems. The web services system 850 is operative to communicate with each of the disparate data services systems for obtaining necessary customer data. The customer data obtained by the web services system is assembled and is returned to the application server 840 for ultimate processing via the middleware layer 842, as described above.

An authentication system 866 may include information such as secure user names, subscriber profiles, subscriber IDs, and passwords utilized by customers for access to network services. As should be understood by those skilled in the art, the disparate systems 862, 864, 866, and 868 may be integrated or provided in any combination of separate systems, wherein FIG. 8 shows only one example.

Although described herein in combination with various computing devices, in alternative embodiments the invention may be used in combination with any number of computer systems, such as in desktop environments, laptop or notebook computer systems, multiprocessor systems, micro-processor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-8. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method for providing a customized programming guide mosaic screen, the method comprising:
   receiving an indication to display a programming guide;
   providing the programming guide by displaying a programming guide mosaic screen;
   in response to providing the programming guide, providing one or more options for customizing the programming guide mosaic screen;
   selecting a video pane from the programming guide mosaic screen;
   receiving an indication of a selection of one of the one or more options to customize a view of the programming guide mosaic screen;
   querying for content associated with the selected option and associated with the selected video pane of the programming guide mosaic screen;
   retrieving the content associated with the selected option and associated with the selected video pane of the programming guide mosaic screen; and
   generating another programming guide mosaic screen of the programming guide including the content associated with the selected option and associated with the selected video pane.

2. The method of claim 1, wherein providing one or more options for customizing the programming guide mosaic screen comprises providing an option for populating the programming guide mosaic screen with one or more recommended video content items.

3. The method of claim 2, further comprising:
   receiving an indication of a selection by a user to populate the programming guide mosaic screen with one or more recommended video content items;
   querying for currently airing video content items with metadata that is similarly matched with content that is frequently viewed by the user;
   retrieving one or more video content items with metadata that is similarly matched with content that is frequently viewed by the user; and
   displaying the one or more video content items in one or more video panes in the programming guide mosaic screen.

4. The method of claim 1, wherein providing one or more options for customizing the programming guide mosaic screen comprises providing an option for populating the programming guide mosaic screen with one or more video content items with metadata that is similarly matched with a selected video content item or with a video content item currently being viewed by a specific user.

5. The method of claim 4, further comprising:
   receiving an indication of a selection by a user to populate the programming guide mosaic screen with one or more video content items with metadata that is similarly matched with a selected video content item or with a video content item currently being viewed the user;
   querying for currently airing video content items with metadata that is similarly matched with content that is selected or that is currently being viewed by the user;
   retrieving one or more video content items with metadata that is similarly matched with content that is selected or that is currently being viewed by the user; and
   displaying the one or more video content items in one or more video panes in the programming guide mosaic screen.

6. The method of claim 5, wherein querying for currently airing video content items with metadata that is similarly matched with content that is selected or that is currently being viewed by the user comprises querying for content comprising one or more metadata tags matching one or more metadata tags associated with the content that is selected or that is currently being viewed by the user.

7. The method of claim 5, further comprising querying for currently airing video content items with metadata that is similarly matched with content that is selected or that is currently being viewed by the user and with metadata that is similarly matched with content that is frequently viewed by the user.

8. The method of claim 1, wherein providing one or more options for customizing the programming guide mosaic screen comprises providing an option for populating the programming guide mosaic screen with one or more video content items with metadata matching a specific mood.

9. The method of claim 8, further comprising:
   providing one or more selectable mood types;
   receiving an indication of a selection by a user to populate the programming guide mosaic screen with one or more video content items with metadata matching a selected mood type;
   querying for currently airing video content items with metadata matching the a selected mood type;
   retrieving one or more video content items with metadata matching the a selected mood type; and
   displaying the one or more video content items in one or more video panes in the programming guide mosaic screen.

10. The method of claim 9, further comprising querying for currently airing video content items with metadata matching the selected mood type and with metadata that is similarly matched with content that is frequently viewed by the user.

11. A system for providing a customized programming guide mosaic screen, the system comprising:
   a memory storage; and
   one or more processing units coupled to the memory storage, wherein the processing unit(s) are operable to:
      provide a programming guide by displaying a programming guide mosaic screen;
      provide one or more options for customizing a view of the programming guide mosaic screen;
      select a video pane from the programming guide mosaic screen;
      receive an indication of a selection of one of the one or more options to customize the programming guide mosaic screen;

query for content associated with the selected option and associated with the selected video pane of the programming guide mosaic screen;

retrieve the content associated with the selected option and associated with the selected video pane of the programming guide mosaic screen; and generate another programming guide mosaic screen of the programming guide including the content associated with the selected option and associated with the selected video pane.

12. The system of claim 11, wherein in providing one or more options for customizing the programming guide mosaic screen, the one or more processors are operable to provide one or more of:

an option for populating the programming guide mosaic screen with one or more video content items recommended to a specific user;

an option for populating the programming guide mosaic screen with one or more video content items with metadata that is similarly matched with a selected video content item or with a video content item currently being viewed by the specific user; or an option for populating the programming guide mosaic screen with one or more video content items with metadata matching a specific mood.

13. The system of claim 12, wherein the one or more processors are further operable to:

receive an indication of a selection to populate the programming guide mosaic screen with one or more recommended video content items;

query for currently airing video content items common to content that is frequently viewed by the specific user;

retrieve one or more video content items common to content that is frequently viewed by the specific user; and display the one or more video content items in one or more video panes in the programming guide mosaic screen.

14. The system of claim 12, wherein the one or more processors are further operable to:

receive an indication of a selection to populate the programming guide mosaic screen with one or more video content items with metadata that is similarly matched with a selected video content item or with a video content item currently being viewed the specific user;

query for currently airing video content items with metadata that is similarly matched with content that is selected or that is currently being viewed by the specific user;

retrieve one or more video content items with metadata that is similarly matched with content that is selected or that is currently being viewed by the specific user; and display the one or more video content items in one or more video panes in the programming guide mosaic screen.

15. The system of claim 14, wherein the currently airing video content items with metadata that is similarly matched with content that is selected or that is currently being viewed by the specific user comprises content with metadata that is similarly matched with content that is frequently viewed by the specific user.

16. The system of claim 12, wherein the one or more processors are further operable to:

provide one or more selectable mood types;

receive an indication of a selection to populate the programming guide mosaic screen with one or more video content items with metadata matching a selected mood type;

query for currently airing video content items with metadata that is similarly matched with the selected mood type;

retrieve one or more video content items with metadata that is similarly matched with the selected mood type; and display the one or more video content items in one or more video panes in the programming guide mosaic screen.

17. The system of claim 16, wherein the content items with metadata that is similarly matched with the selected mood type comprise content items with metadata that is similarly matched to content that is frequently viewed by the specific user.

18. A computer-readable storage device having stored thereon computer-executable instructions which when executed by a computer perform a method for providing a customized programming guide mosaic screen, comprising:

provide a programming guide by displaying a programming guide mosaic screen;

providing one or more options for customizing a view of the programming guide mosaic screen;

selecting a video pane from the programming guide mosaic screen;

receiving an indication of a selection of one of the one or more options to customize the programming guide mosaic screen;

querying for content associated with the selected option and associated with the selected video pane of the programming guide mosaic screen;

retrieving the content associated with the selected option and associated with the selected video pane of the programming guide mosaic screen; and generating another programming guide mosaic screen of the programming guide including the content associated with the selected option.

19. The computer-readable storage device of claim 18, wherein providing one or more options for customizing a programming guide mosaic screen comprises providing one or more of:

an option for populating the programming guide mosaic screen with one or more video content items recommended to a specific user;

an option for populating the programming guide mosaic screen with one or more video content items with metadata that is similarly matched with a selected video content item or with a video content item currently being viewed by the specific user; or an option for populating the programming guide mosaic screen with one or more video content items with metadata that is similarly matched with a specific mood.

20. The computer-readable storage device of claim 18, further comprising:

receiving an indication of a second selection of one of the one or more options to customize the programming guide mosaic screen;

querying for content associated with the secondly selected option;

retrieving the content associated with the secondly selected option; and refreshing the mosaic display of the programming guide to display the content associated with the secondly selected option.

* * * * *